United States Patent [19]

Ramsey

[11] 4,030,388
[45] June 21, 1977

[54] FILM SEVERING METHOD AND APPARATUS

[75] Inventor: Harold Eugene Ramsey, Wilmington, Del.

[73] Assignee: E. I. Du Pont de Nemours and Company, Wilmington, Del.

[22] Filed: May 14, 1976

[21] Appl. No.: 686,507

[52] U.S. Cl. .................................. 83/49; 83/52; 83/56; 83/214; 83/276; 83/409; 83/451; 83/614; 83/661

[51] Int. Cl.² ........................................ B26D 1/26

[58] Field of Search .................. 83/49, 52, 56, 214, 83/276, 277, 409, 451, 614, 661, 42

[56] References Cited

UNITED STATES PATENTS

| | | | |
|---|---|---|---|
| 2,792,890 | 5/1957 | Dyken | 83/614 X |
| 3,269,242 | 8/1966 | Hooper et al. | 83/276 X |
| 3,620,114 | 11/1971 | Chudyk | 83/214 X |
| 3,813,974 | 6/1974 | Friberg et al. | 83/276 X |

Primary Examiner—Frank T. Yost

[57] ABSTRACT

A film severing method and apparatus is provided in which a film having first and second edges is engaged by film holding devices and the film is severed in a transverse path between such holding devices while the film is held on either side thereby, such severing including:

cutting the film at the first edge by moving a severing device into the film at a position spaced from the first edge and thereafter moving it in a first direction toward and through such first edge to form a partial cut and completing the severing of the film by moving another severing device in a second direction into the partial cut and thereafter through the film toward and through the second edge whereby to sever the film.

7 Claims, 16 Drawing Figures

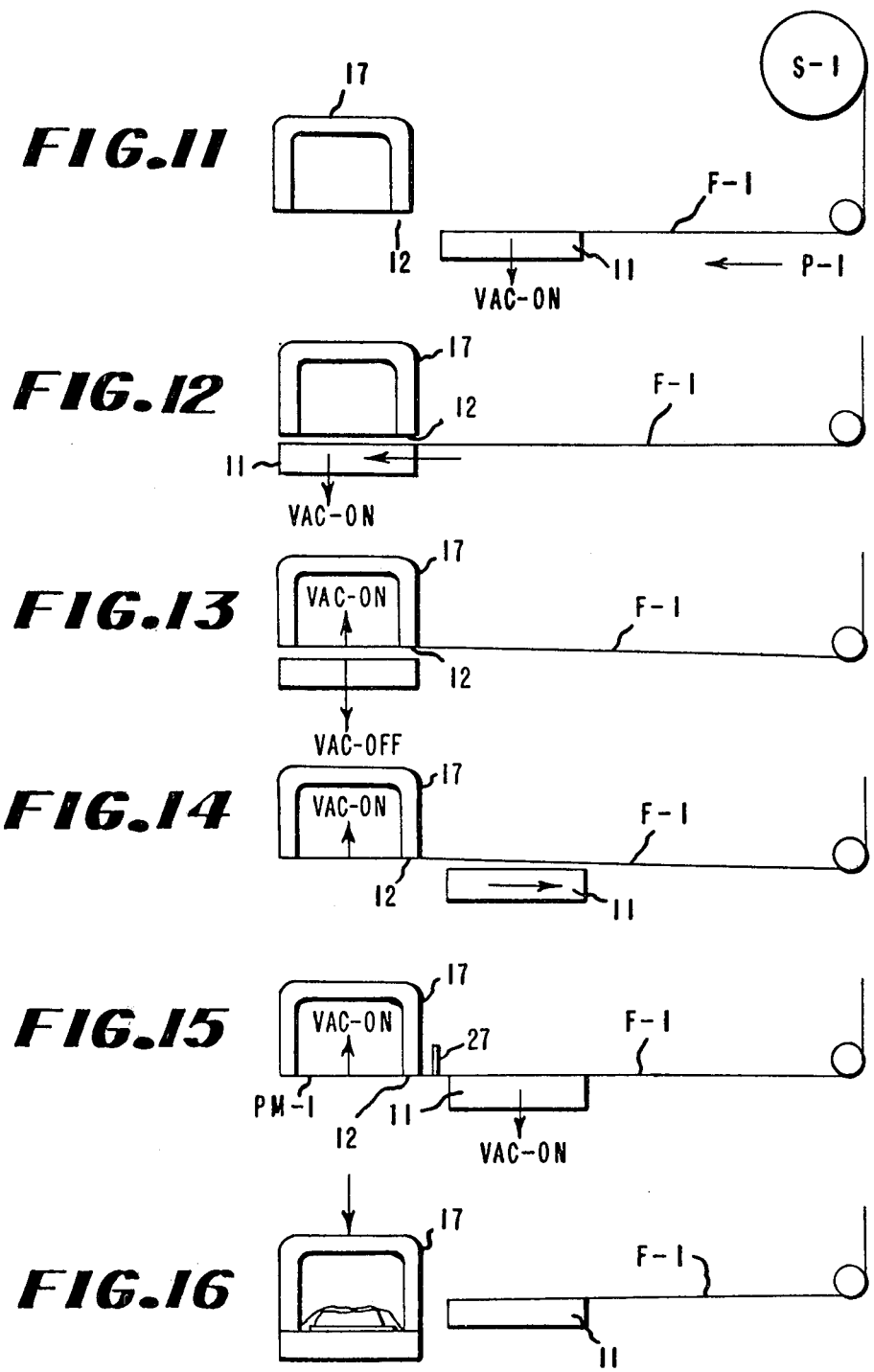

FILM SEVERING METHOD AND APPARATUS

BACKGROUND OF THE INVENTION

1. Field of the Invention

The field of art to which this invention pertains is material severing and, more particularly, it is desired to a method of and apparatus for severing thermoplastic film.

More specifically, such invention relates to a method of and apparatus for engaging the surface portion of a film from a supply roll and moving it to a position in a path of the film whereat such film is transferred to another holding means. The first holding means then returns to its original position where it engages another portion of the film; with the film so engaged by the first and second holding means, it is severed therebetween, using two knives, to form a package member.

2. Decription of the Prior Art

Film severing methods and apparatus of this general type are old. It is known, for example, to move a film, by manual or other means past a film severing device and to sever it while it is held on each side of such severing device.

U.S. Pat. No. 3,748,939 to Feinstein et al, which is typical of the art, shows an apparatus for severing sheet material which includes a transverse web cutting means having a blade that is mounted in a blade carriage which is frictionally affixed to an endless cord and drive means for transversely moving the blade across the sheet and returning it to its starting position. U.S. Pat. No. 3,633,447 to Casida shows apparatus for cutting metal sheets in which cutting elements on a continuous chain are used to cut such metal; again, a commonly used arrangement for cutting or severing sheet material.

And, lastly, U.S. Pat. No. 3,910,008 to Johnson shows the use of a hot cutting wire for severing film as it is held by and between vacuum frames, as a step in making a vacuum package.

It is often difficult to cut or sever a web or sheet of material, particularly thermoplastic film, across its width because of the high stresses as it strikes the edge of the film at the crucial starting phase of such cutting. There is a tendency, for example, for the web to be pulled away from the various devices holding it in position for severing but, more importantly, there is a real possibility that the film will not be cut or severed accurately and cleanly without unnecessary wear and tear on the cutting or severing device. In addition, there may be a tendency for the film to bunch up when struck by the severing knife, at the start of cutting, which further complicates the severing operation.

A problem with the teachings of the art as discussed above, and with the other known art, is their failing to provide or give to the film severing art, a relatively simple means and method of severing a film, without undue cutting or severing stresses, as in the method of the instant invention, by moving a severing starting knife or means into the film near one of its edges and forming a partial cut, followed by the moving, in an opposite direction, of a film completing severing knife or means into this partial cut (without any stress problems occurring) and through the film to sever it.

SUMMARY OF THE INVENTION

Briefly summarized, this invention is a method including the steps of:

engaging a portion of a film having first and second edges with a first holding means;

engaging another portion of the film by a second holding means; and severing the film in a transverse path between the first and second holding means while the film is held on either side by such first and second holding means, such severing including cutting the film at the first edge by moving a severing initiating means into the film at a position spaced from the first edge and thereafter in a first direction toward and through such first edge to form a partial cut, and completing the severing of the film by moving a severing completing means in a second direction into the partial cut and thereafter through the film toward and through the second edge thereof whereby to sever the film.

Preferably, the film is held by vacuum means of the first and second holding means during severing.

This invention gives to the art a highly useful method of an apparatus for severing a web of thermoplastic film while it is held by two holding means, without placing undue stress on the film during severing, which heretofore has been unavailable to it.

BRIEF DESCRIPTION OF THE DRAWINGS

FIGS. 11–16 show, schematically, the operation of various parts of the apparatus of FIG. 1, primarily the upper film first holding means and second holding means (the movable vacuum chamber), and fixed vacuum plate, in forming a vacuum skin-package.

DESCRIPTION OF A PREFERRED EMBODIMENT

This invention is a method of and apparatus for severing a sheet and, more particularly, is directed to the severing of thermoplastic film in the making of a vacuum skin-package.

Briefly described, such package-making apparatus generally includes:

means for moving an upper film from a supply source along a path to a package-forming station;

means for moving a lower film with a product to be packaged positioned thereon along another path into a package-forming starting position at the package-forming station;

means for severing the upper film to form an upper package member, which member is, without further movement, positioned in its package-forming starting position at the package-forming station; and means for forming or making a vacuum skin-package at such package-forming station.

In essence, it is seen that such apparatus generally performs two functions: (1) it places in prepackage-positioning steps the upper and lower films, and the product being packaged, in their operative positions at the package-forming station and, (2) then forms the vacuum skin-package at that station.

Figure 1:
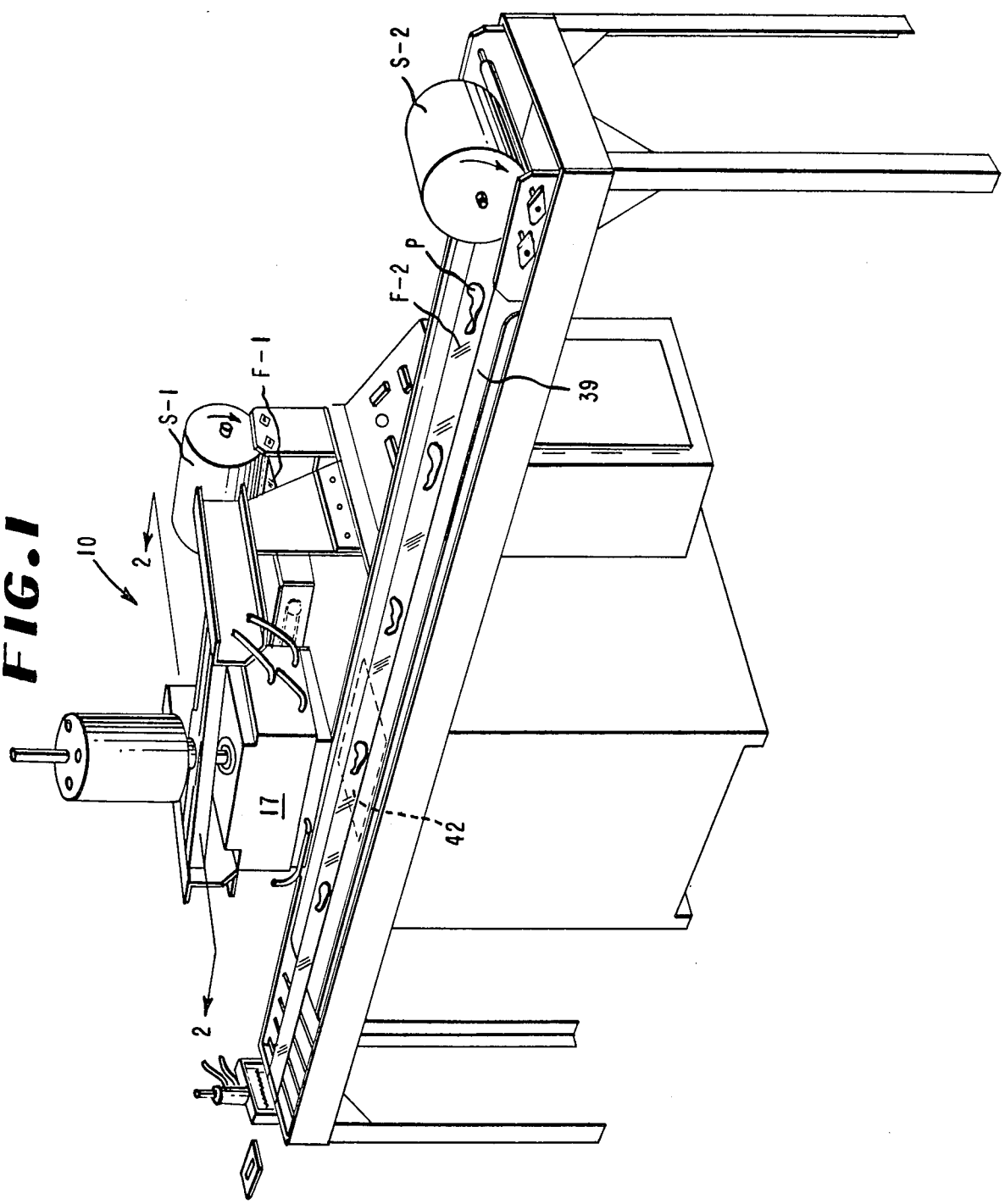
FIG. 1 is a perspective view of an apparatus which has as one of its key parts a severing apparatus of this invention, which severing apparatus is suitable for carrying out a method of severing a sheet, such as thermoplastic film, also of this invention.
Figure 2:
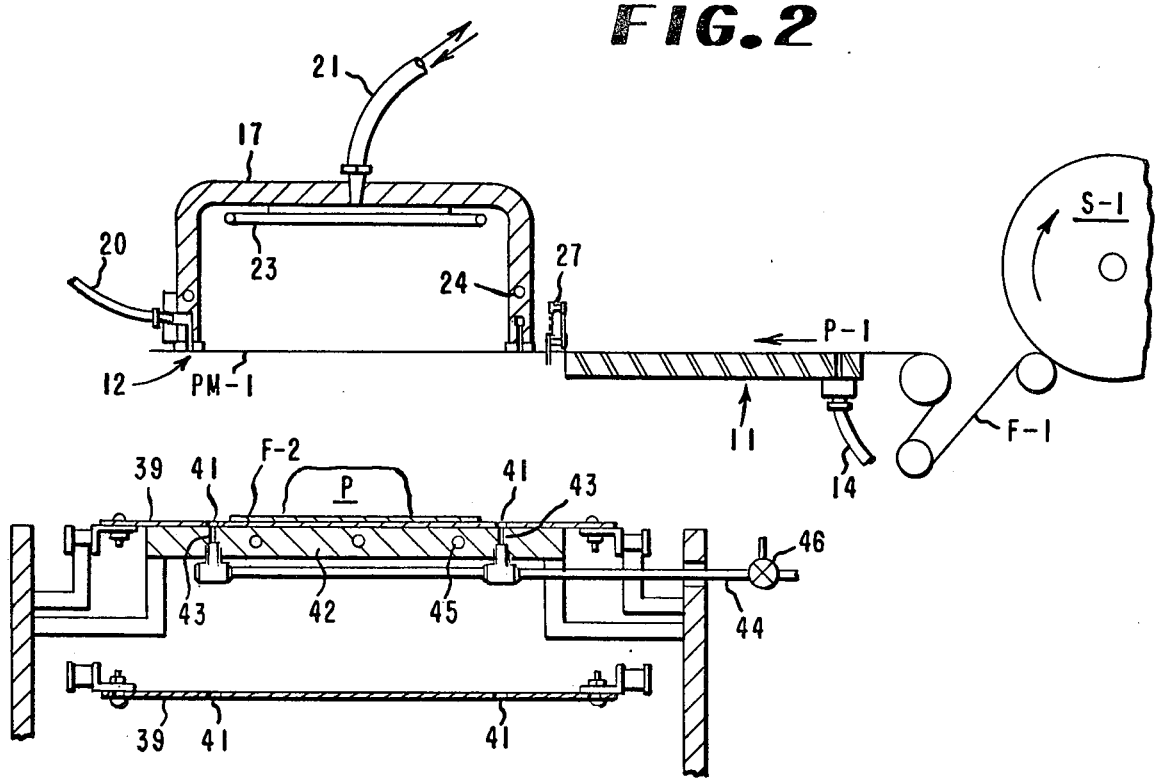
FIG. 2 is a sectional view of the apparatus of FIG. 1 taken along lines 2—2 thereof (with parts omitted for clarity).
Figure 3:
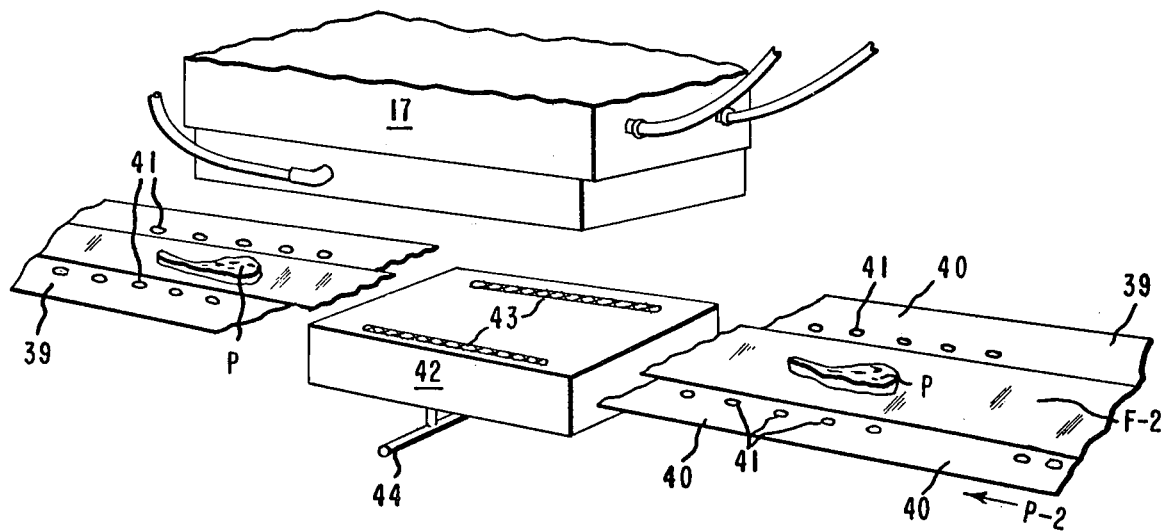
FIG. 3 is a perspective view showing, in greater detail, various parts of the apparatus of FIG. 1, including means for creating a vacuum at a package-forming station (including a movable vacuum chamber and a fixed vacuum plate), and further showing a lower film with a product to be packaged thereon positioned on a conveyor belt which is movable to and past the package-forming station.

Referring to the drawings, and FIGS. 1, 2 and 3 in particular, in starting to make such package an upper thermoplastic film F-1 is supplied from a supply source S-1 and moved along a first path P-1 by appropriate mechanical moving means to the package-forming station. The supply source may be any appropriate source, for example, it may be a roll of ionomer film.

At the package-forming station, the upper film F-1 is severed to form an upper package member PM-1, which, as formed, is in position ready to start the package-making operation. The movement of the upper film F-1 to this station and the forming there of the package member PM-1 are first key steps in the making of the package and further represent improvements in the art of material handling.

These steps in starting the making of a vacuum skin-package in accordance with this invention, accordingly, include the material handling method steps of:

engaging a portion of a film, such as upper film F-1, supplied from supply source S-1 with a first holding means 11 located in a first position in the path P-1 of the film (as seen in FIG. 11); moving the first holding means 11 and engaged film F-1 to a second position located adjacent to a second holding means 12 (as seen in FIG. 12);

transferring the film F-1 from the first holding means 11 to the second holding means 12 at such second position (as seen in FIG. 13);

returning the first holding means 11 to its first position while the film F-1 is held in the second position by the second holding means 12 (as seen in FIG. 14);

engaging another portion of the film F-1 at the first position by the first holding means 11 (as seen in FIG. 15); and severing the film F-1 in a transverse path between the first and second positions to form a package member PM-1 while the film is held on either side of the transverse severence path by the first and second holding means 11 and 12 (again as seen in FIG. 15).

In the preferred embodiment of this invention being described, the second holding means 11 is a part of a movable vacuum chamber, further to be described, which holds the upper package member PM-1 in its starting position, in making a package, at the package-forming station.

In the making of the package at this station the material handling method of this invention includes the further steps of:

moving the second holding means 12 and held package member PM-1 to a third position in a path perpendicular to the plane of the path P-1 of the film as a step in the package-making method.

By following these basic material handling steps, it is possible readily to bring the upper package member PM-1 into its proper position at the package-forming station, ready to start the package-making operation, using a minimum of parts and motions. It, then, is only necessary to bring the lower film and product to be packaged to this station, as later will be described, to complete the preliminary prepackage-forming positioning steps, prior to the package-making operation.

UPPER FILM HOLDING MEANS

As best seen in FIGS. 2, 4 and 11-15, the upper film F-1 used to make the vacuum skin-package in accordance with this invention is supplied from the upper film supply roll S-1 and is moved to the package-forming station by use of the first (upper film) holding means 11 which operates in the path P-1 of the upper film supply (as best shown by the direction arrow in FIG. 2).

Figure 4:
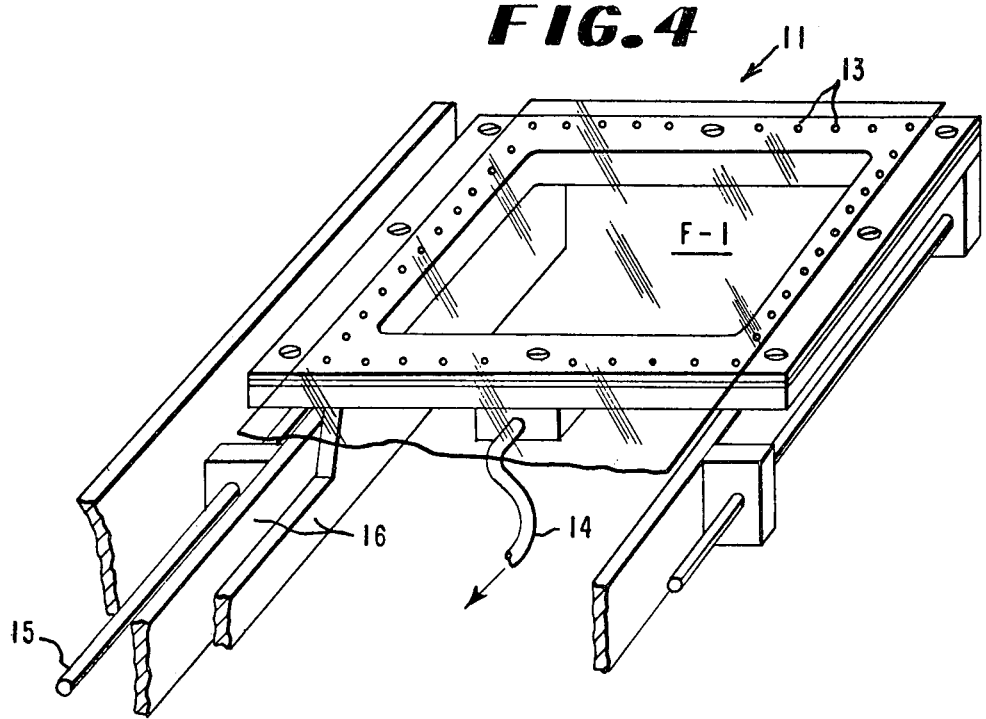
FIG. 4 shows an upper film holding means (and associated parts) with the upper film engaged thereby, such holding means being adapted to be moved into a package-forming starting position at the package-forming station.

FIG. 4 shows the first holding means 11 in greater detail. The upper film F-1 is held against the upper surface of the first holding means 11 during dwell and film moving sequences by use of vacuum holes 13 positioned around the upper peripheral surface thereof, which holes are connected to a vacuum system 14. The leading edge of the upper film F-1 is shown adjacent to the leading edge of the first holding means 11 in this figure.

This holding means 11 and its captive piece of upper film F-1 is moved, by appropriate means, under the lower surface of the second holding means 12, as guided by outer guides 15 and inner guides 16. The leading edge of the first holding means 11 is lowered and raised by a cam mechanism attached to these guides (not now in FIG. 4) during this movement. As thus moved, the film is positioned adjacent a movable vacuum chamber 17, of which the second holding means 12 is a part, and the upper film F-1 is transferred from the first holding means 11 into engagement with the second holding means 12 of such vacuum chamber 17 at the package-forming station.

In summary, at this stage of making the package, the positioning of the upper film in this embodiment includes the steps of:

engaging the upper film F-1 with a first holding means 11;

moving the engaged upper film F-1 to a position adjacent the vacuum chamber 17; and transferring the upper film F-1 from the first holding means 11 into engagement with the vacuum chamber 17 at the packageforming station.

Further, also in summary, a material handling apparatus for so positioning the upper film includes:

the first holding means 11 for engaging a portion of a film in the first position in the path P-1 of the film F-1;

means for moving the first holding means 11 and engaged film F-1 to second position located adjacent to the second holding means 12;

means for transferring the film F-1 from the first holding means 11 to the second holding means 12 at such second position;

means for returning the first holding means 11 to its first position while the film F-1 is held in the second position by the second holding means 12, such first holding means 11 being adapted to engage another portion of the film F-1 at such first position; and means, later to be described in detail, for severing the film in a transverse path between the first position and the second position to form a package member PM-1 while the film on either side of the transverse severance path is held by the first and second holding means 11 and 12.

In other embodiments of this invention, the upper film (or an upper package member) may be brought into engagement with the second holding means 12 of the vacuum chamber 17 manually, or by other appropriate means.

MOVABLE VACUUM CHAMBER

Figure 5:
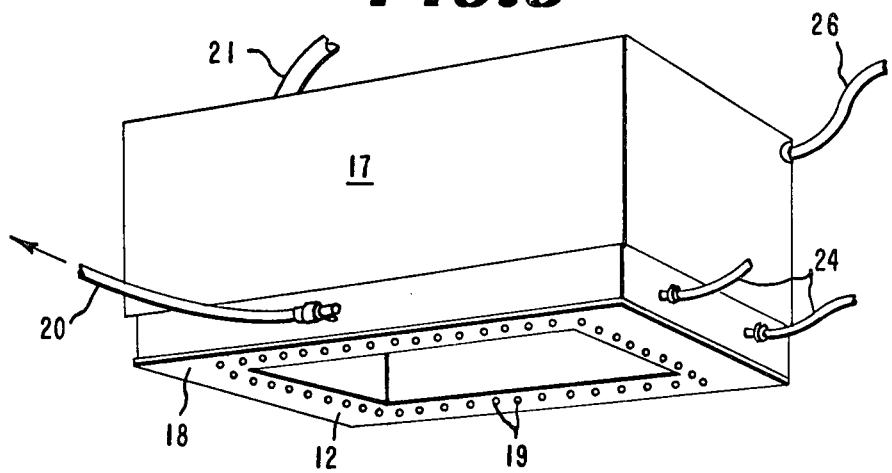
FIG. 5 shows another upper film holding means, in the form of the movable vacuum chamber as shown in FIG. 3, in a perspective showing.

FIG. 5 shows the movable vacuum chamber 17 in greater detail.

Figure 9:
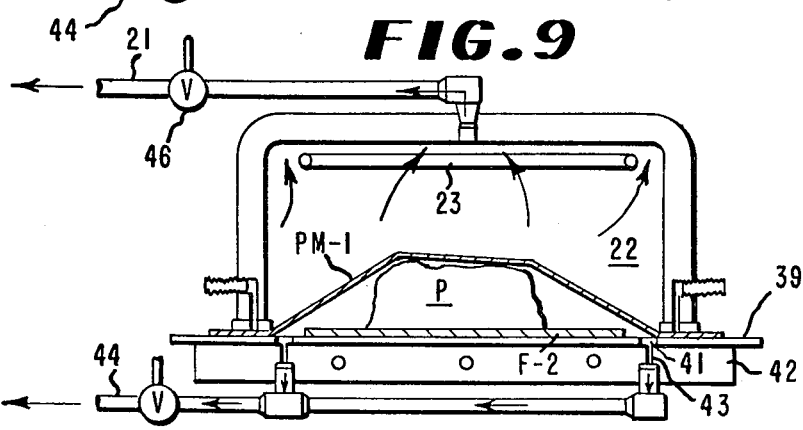
FIG. 9 shows the apparatus parts of FIG. 8 in a package-forming first position at the package-forming station.
Figure 10:
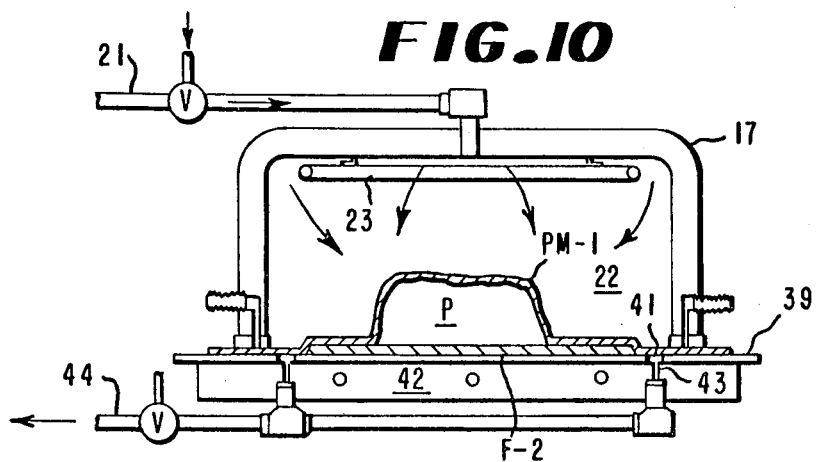
FIG. 10 shows the apparatus parts of FIGS. 8 and 9 in a package-forming second position at the package-forming station, with only lower film severing required at a later station to complete the package-forming operation.

As previously explained, the second holding means 12 is located at the mouth of this vacuum chamber 17, at a resilient lower surface 18 thereof, which surface is adapted to form a fluid-tight seal when operatively engaged with a fixed plate, later to be described, as best seen in FIGS. 9 and 10, in key stages in the package-making operation. Such holding means 12 is controlled by an upper film holding vacuum means which controls the transfer of the upper film F-1 and holds it in place while it is severed, heated, and draped over the product in later package-making stages.

In further detail, such chamber 17 includes means defining a plurality of holes 19 around its lower peripheral surface 18, which holes 19 communicate with a vacuum conduit means 20. The advanced upper film F-1 when in the starting position at the package-forming station preferably is held against this lower surface 18 of the vacuum chamber 17 by actuating these vacuum means. This surface 18 or mouth of the vacuum chamber 17, as stated, is resilient for later effecting a fluid-tight seal in a package-making stage or step.

The vacuum chamber 17 additionally is equipped with vacuum means, in the form of a vacuum conduit 21, for forming a vacuum in the space 22 in the chamber 17 above the upper package member PM-1 as held by the second holding means 12 (as best seen in FIGS. 9 and 10) and for venting this space 22; means, including a heater 23 positioned in the upper part of the chamber 17, for heating the upper film PM-1 to a formable condition; and means 24 for cooling such film and for keeping the second holding means 12 at a temperature low enough to prevent excessive heating of the upper film F-1 during the preliminary package-making operations. The chamber vacuum means is operable through a suitable three-way valve 25 and the upper film heater 23, as best shown in FIG. 8, is connected to a power source by heater power leads 26.

After the upper film F-1 has been transferred to the second holding means 12 of the vacuum chamber 17, it is severed from the supply source to form the package member PM-1, as further will be described. This member PM-1 is then heated by the electric heater 23 as a last preliminary step prior to the package-making operation.

Figure 8:
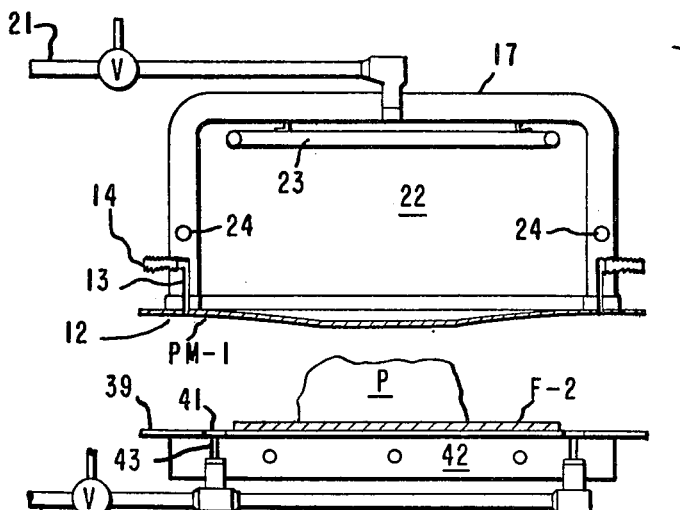
FIG. 8 shows a cross-sectional view of parts of the apparatus of FIG. 1 in a package-forming starting position at the package-forming station.

Appropriate means, not shown, are provided for moving this chamber 17 and the heated package member PM-1 held by the second holding means 12 from its starting position at the package-forming station, as shown in FIG. 8, downwardly, as a step in the package-forming operation, as further will be explained.

UPPER FILM SEVERING MEANS AND METHOD

In making a package according to this invention, a method of and means for severing the upper film F-1 is provided which further represents a means and method of severing film in other environments.

Figure 6:
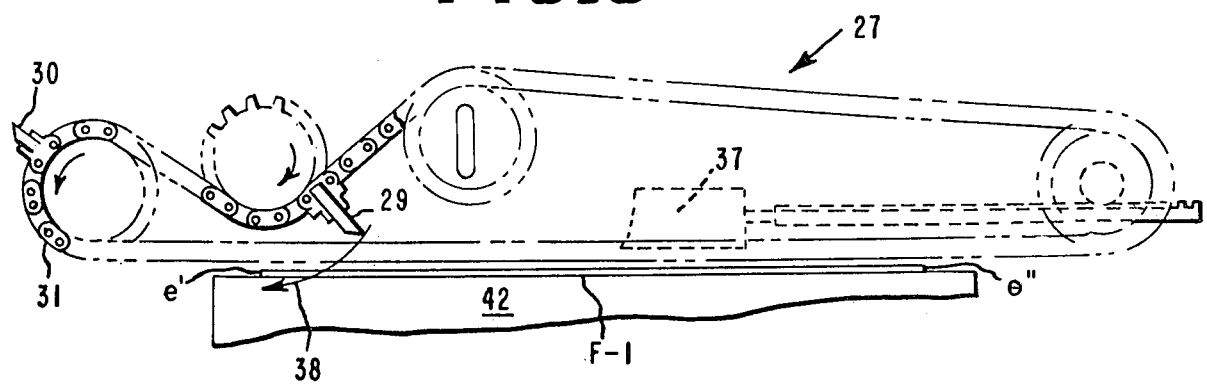
FIGS. 6 and 7 are schematic showings of a severing apparatus of the invention for partially, then fully, severing a sheet in the apparatus of FIG. 1 to form a package member at such package-forming station.
Figure 7:
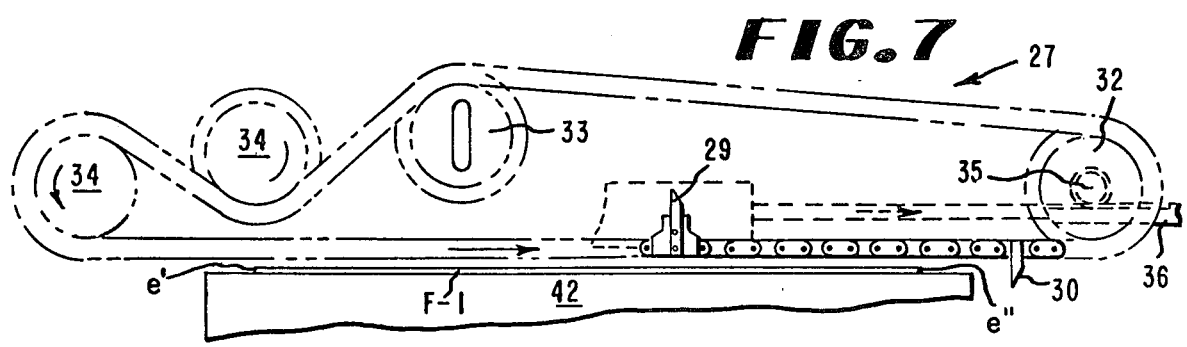

Broadly speaking, such film severing method includes the steps of:

engaging a portion of a film, such as upper film F-1, having first and second edges $e'$ and $e''$ with a first holding means, such as holding means 11;

engaging another portion of the film F-1 by a second holding means, such as holding means 12; and severing the film, for example, using a severing means 27, as shown in FIGS. 6 and 7, in a transverse path between the first and second holding means while the film F-1 is held on either side by such first and second holding means, such severing including cutting the film F-1 at the first edge $e'$ by moving a severing initiating means 29 into the film at a position spaced from the first edge $e'$ and thereafter in a first direction toward and through such first edge $e'$ to form a partial cut, and completing the severing of the film by moving a severing completing means 30 in a second direction into the partial cut and thereafter through the film F-1 toward and through the second edge $e''$ thereof whereby to sever the film F-1.

Preferably the film F-1 is held by vacuum means of the first and second holding means during severing.

And, as a preliminary operation, in the package-making method, in a preferred embodiment of this invention, such film-severing method includes the steps of:

engaging a portion of the film F-1 with the first holding means 11 located in a first position in a path P-1 of the film;

moving the first holding means 11 and engaged film F-1 to a second position located adjacent a second holding means 12;

transferring the film F-1 from the first holding means 11 to the second holding means 12 at such second position;

returning the first holding means 11 to its first position while the film F-1 is held in the second position by the second holding means 12;

engaging another portion of the film F-1 at the first position by the first holding means 11; and severing the film F-1 in a transverse path between the first and second positions while the film is held on either side of the transverse severance path by the first and second holding means 11 and 12, such severing including:

cutting the film F-1 near the first edge $e'$ by moving the severing initiating means 29 into the film at a position spaced from the first edge $e'$ and thereafter in a first direction toward and through such first edge to form a partial cut and completing the severing of the film by moving the severing completing means 30 in an opposing second direction into the partial cut and thereafter through the film toward and through the second edge e″ whereby to sever the film.

This severing step forms the package-member PM-1, which, as severed, is in its package-forming start-up position, as so held by the second holding means 12 of the movable vacuum chamber 17.

The severing means 26 preferred for use in accordance with this invention is shown in detail in FIGS. 6 and 7.

The first cutting performed by the severing means 26 is in the form of a first film-nicking step, followed by a continued severing step. These operations are respectively performed by the severing initiating means 29 (preferably in the form of a knife blade) and the severing completing means 30 (also preferably in the form of a knife blade), which blades are mounted on an endless roller chain 31. The endless chain 31 is driven by a driving sprocket 32 and is guided in its path by a take-up idler sprocket 33 and fixed idler sprockets 34. Pinion 35 is attached to driving sprocket 32 and is actuated by rack 36, by operation of an actuating rack cylinder 37.

FIG. 6 shows the severing means 26 in its dwell position prior to the film severing operation. At the start of the severing operation the first knife blade 29 moves into the upper film F-1 to produce a cut or nick that is started inside the edge e′ of the upper film F-1 and continues to and through the edge e′, as shown by direction arrow 38 in FIG. 6.

The severing completing means 30 then meets the upper film F-1 at the end of the severance path formed by the severing initiating means 29 and severs the remaining portion of the upper film F-1 in a transverse and opposite direction. This manner of severing eliminates the high cutting forces and associated film distortion encountered when the complete transverse cutting or severing is attempted with a single blade which is initiated against one edge of the film and then through it is a single direction.

FIG. 7 shows the severing means as it appears on the completion of the severing operation. The first knife blade 29 traverses the path across the film F-1 in an upright position situated above the film in an inverted configuration as shown in FIG. 7, while the second blade completes the severing of the film F-1 to form, in an embodiment of this invention, the package-member PM-1.

Continuing with the starting, prepositioning steps involved in the making of the package, as best seen in FIGS. 1 and 3, a lower thermoplastic film F-2 is supplied from a supply source, such as supply roll S-2, and moved in a second path P-2 to the package-forming station. This phase of the method of making such package includes the predetermined positioning of the lower film F-2 on a conveyor belt 39. This belt 39 has means defining opposed sets 40 of apertures 41 spaced from each along the edges of the belt, as best seen in FIG. 3, and the lower film F-2 is positioned between and spaced from these opposed sets of apertures 41, so that they may remain open.

A product P to be packaged is then placed on the lower film F-2 between opposed sets 40 of apertures in such belt 39. The belt 39 having the lower film F-2 and the product P so positioned thereon is moved to the package-forming station, by appropriate means, and above a fixed vacuum plate 42 further to be described and in operative relationship therewith. In this position, the lower film F-2 and the product P are in their starting positions, ready for the package-forming steps to begin.

FIXED VACUUM PLATE

FIG. 3 shows, in greater detail, the fixed vacuum plate 42 that is used in conjunction with the movable vacuum chamber 17 to produce the vacuum enclosure that makes possible the making of a package by the method of this invention. The plate 42 contains openings 43 at its edges covered with fine mesh screens that communicate with a vacuum pumping system 44 to remove air through such openings.

The cut-away view of the belt, 39, as seen in FIG. 2, for example, shows the spaced apertures 41 in such belt that permit passage of air through the belt 39. As shown, the opposed openings 43 along the edges of the plate 42 are aligned with opposed apertures 41 in the belt 39 at the package-forming station. Air is drawn through these apertures 41 and openings 43 to form a vacuum around the product, when forming the package.

The plate 42 further is provided with means for heating the lower film, in the form of heating elements 45, such as cartridge heaters, whereby the lower film F-2 will be rendered heat-sealable to the upper film F-1 in making the package.

In greater detail the fixed vacuum plate 42 preferably is machined from a solid metal block and contains a temperature sensor. The openings 43 in the plate 42 preferably are covered by the screens or sintered metal. The entire block or plate may be heated.

In other preferred aspects of this invention, the upper film supply roll S-1 is positioned at a right angle relative to the lower film supply roll S-2; accordingly, the film paths P-1 and P-2 are at right angles to each other in the movement of the respective films to the package-forming station.

Upon completion of the package-making operation, as will now be described in detail, the conveyor belt 39 continues its movement, to the left as shown in FIG. 3, for example, carrying with it the lower film F-2, the product P, and the upper package member PM-1, which is in skin-like contact with the product P and heat-sealed to the lower film F-2.

Preferably, from the package-making station these parts are next moved to a cooling station, as best shown in FIG. 1, to aid in the separation of the lower film F-2 from the conveyor belt 39. From this station, after separation, the parts are moved to a final station consisting, for example, of a guillotine cut-off knife which cuts such lower film F-2 and completes the formation of an individual vacuum skin-package.

In other embodiments of this invention, the upper film F-2 may be moved to the package-forming station by tenter clips, such as are used in a typical tenter frame. These clips preferably are spaced in sets on continuous chains and perform similar functions to the first holding means 12 in the preliminary steps of the package-forming operation. Preferably, the belt 39 is of Kapton (Trademark of E. I. du Pont de Nemours and Company) polyimide film.

After the upper film package PM-1, the product P and the lower film or package member PM-2 are in their operative positions at the package-making station, as shown in FIG. 8, the package-making operation may begin.

METHOD OF MAKING THE PACKAGE

Broadly described, a method of making a vacuum skin-package according to this invention includes the steps of:

positioning the lower film F-2 on the conveyor belt 39, such belt 39 having means defining opposed sets 40 of apertures spaced from each other along the edges of the belt and the lower film F-2 being positioned between the opposed sets 40 of apertures in the belt 39;

placing the product P to be packaged on the lower film F-2 between opposed sets 40 of apertures in the belt;

moving the belt having the lower film F-2 and the product P thereon to the package-forming station above the fixed vacuum plate 42 having means defining opposed openings 43 along the edges threof, such openings 43 being aligned with opposed sets 40 of apertures 41 in the conveyor belt 39 at the package-forming station, engaging the upper package member PM-1 with the vacuum chamber 17 at the package-forming station;

heating the upper package member PM-1;

moving the vacuum chamber 17 and the heated upper package member PM-1 downwardly so as to drape this member around the product and to form a hermetic seal between the vacuum chamber 17, the conveyor belt 39, the lower film F-2, upper package member PM-1 and the vacuum plate 42 and to enclose therewithin the opposed sets 40 of apertures 41 in the conveyor belt that are aligned with the opposed openings 43 in the vacuum plate 42 (as shown in FIG. 9);

evacuating the space above the upper package member PM-1 and also around the product P, the latter occurring through such aligned apertures 41 in the conveyor belt 39 and openings 43 in the vacuum plate 42 while maintaining the hermetic seal (as shown in FIG. 9); and pushing the upper package member PM-1 by pressure differential into skin-tight conformity with the product P and into heat-sealing contact with the lower film F-2 (as shown in FIG. 10) to form a vacuum skin-package.

Such method also may include:

engaging the upper film F-1 with the first holding means 11;

moving the engaged upper film F-1 to a position adjacent the vacuum chamber 17; and transferring the upper film F-1 from the first holding means 11 into engagement with the vacuum chamber 17 at the package-forming station.

Preferably, in this method, the conveyor belt 39 with the lower film F-2 and the product P thereon is moved in a first direction to the package-forming station, and the upper film F-1 is moved in a second direction transverse to the first direction to the package-forming station. And, lastly, the vacuum chamber 17 and heated upper film F-1 are moved downwardly in a third direction or path P-3 perpendicular to the plane of the first and second directions paths P-1 and P-2 to the package-forming station so as to drape such upper film F-1 around the product P and to form the hermetic seal between the vacuum chamber, the conveyor belt, the lower film, the upper package member and the vacuum plate and to enclose therewithin the opposed sets of apertures 41 in the conveyor belt 39 that are aligned with the opposed openings 43 in the vacuum plate 42.

A method and apparatus of this invention for making a vacuum skin-package is shown in FIGS. 8, 9 and 10.

In FIG. 8, lower film F-2 and the conveyor belt 39 are shown in a sectional view transverse to the run of the conveyor belt 39 while the upper package member PM-1 is shown in a sectional view taken along the run of the upper film F-1 which is normal to the direction of the conveyor belt 39. The upper film F-1 has been supplied from the upper film supply roll S-2 as has been described in detail. The upper package member PM-1, as shown, is maintained in position at the mouth of the vacuum chamber 17 by means of the second holding means 12 which is a part of the vacuum chamber 17 and is connected to the upper vacuum system 20 via the vacuum holding ring. The chamber vacuum system 21 is not in its operative state in FIG. 8 since the three-way valve controlling it is in the vented position. The heater 23 is energized to warm the upper package member PM-1 sufficiently to enable it to be drawable.

The lower film F-2 shown in FIG. 8 is positioned on the conveyor belt 39 between the conveyor belt apertures 41 while the product P is positioned on the lower film F-2. The plate heaters 45 provide sufficient heat through the conveyor belt 39 to keep the upper surface of lower film F-2 in a condition for rapid bonding to the heated upper package member PM-1.

FIG. 9 shows the package-forming operation when the vacuum chamber 17 has been closed to form a hermetic seal with the fixed plate 42 while portions of the conveyor belt 39, upper package member PM-1 and lower film F-2 are contained within the sealing area bounded by the fixed plate 39 and the resilient lower surface of the vacuum chamber 17. In this sealing position air is removed from above the upper package member PM-1 via the chamber vacuum system 21 and its upper three-way valve and is removed below the upper member PM-1 and from around the product P via the lower vacuum system 44 and its lower three-way valve. Thus, the lower film F-2 and product P are situated in a vacuum under complete cover of the upper package member PM-1.

The final stage of the vacuum skin-packaging operation is shown in FIG. 10. Vacuum beneath the upper package member PM-1 is maintained through the lower vacuum system 44 while the space in the vacuum chamber 17 above the upper package member PM-1 is vented to the atmosphere via the chamber vacuum system 21 and its three-way valve. The differential pressure resulting across the heated upper package member PM-1 forces it down around the product P into skin-tight conformity and into heat-sealing contact with the lower film F-2 around the confines of the product P to produce the skin-tight vacuum package shown in a cross-sectional view in FIG. 10. This, in essence, completes the making of the package.

I claim:

1. A flm severing method including the steps of:
   engaging a portion of a film having first and second edges with a first holding means;
   engaging another portion of the film by a second holding means; and
   severing the film in a transverse path between the first and second holding means while the film is held on either side by such first and second holding means, such severing including
   cutting the film at the first edge by moving a severing initiating means into the film at a position spaced from the first edge and thereafter in a first direction toward and through such first edge to form a partial cut, and completing the severing of the film by moving a severing completing means in a second direction into the partial cut and thereafter through the film toward and through the second edge thereof whereby to sever the film.

2. The method of claim 1 wherein the film is held by vacuum means of the first and second holding means during severing.

3. A film severing method including the steps of:
engaging a portion of a film with a first holding means located in a first position in a path of the film;
moving the first holding means and engaged film to a second position located adjacent a second holding means;
transferring the film from the first holding means to the second holding means at such second position;
returning the first holding means to its first position while the film is held in the second position by the second holding means;
engaging another portion of the film at the first position by the first holding means; and
severing the film in a transverse path between the first and second positions while the film is held on either side of the transverse severance path by the first and second holding means, such severing including:
cutting the film near the first edge by moving a severing initiating means into the film at a position spaced from the first edge and thereafter in a first direction toward and through such first edge to form a partial cut and completing the severing of the film by moving a severing completing means in an opposing second direction into the partial cut and thereafter through the film toward and through the second edge whereby to sever the film.

4. Apparatus for severing a sheet including:
means for engaging a portion of a sheet having first and second edges with a first holding means;
means for engaging another portion of the sheet by a second holding means; and
means for severing the sheet in a transverse path between the first and second holding means while the sheet is held on either side by such first and second holding means; such severing means including means for cutting the sheet at the first edge by moving a severing initiating means into the sheet at a position spaced from the first edge and thereafter in a first direction toward and through such first edge to form a partial cut, and means for completing the severing of the sheet by moving a severing completing means in a second direction into the partial cut and thereafter through the sheet toward and through the second edge thereof whereby to sever the sheet.

5. The apparatus of claim 1 wherein the sheet is held by vacuum means of the first and second holding means during severing.

6. The apparatus of claim 4 wherein the sheet is thermoplastic film.

7. A film severing apparatus including:
first holding means for engaging a portion of a film located in a first position in a path of the film;
second holding means for engaging such film;
means for moving the first holding means and engaged film to a second position located adjacent such second holding means;
means for transferring the film from the first holding means to the second holding means at such second position;
means for returning the first holding means to its first position while the film is held in the second position by the second holding means,
such first holding means being adapted to engage another portion of the film at this first position; and
means for severing the film in a transverse path between the first and second positions while the film is held on either side of the transverse severance path by the first and second holding means, such severing means including:
means for cutting the film near the first edge by moving a severing initiating means into the film at a position spaced from the first edge and thereafter in a first direction toward and through such first edge to form a partial cut and means for completing the severing of the film by moving a severing completing means in an opposing second direction into the partial cut and thereafter through the film toward and through the second edge whereby to sever the film.

* * * * *